United States Patent
Zaidi et al.

(10) Patent No.: US 9,912,142 B2
(45) Date of Patent: Mar. 6, 2018

(54) CABLE PROTECTION DEVICE

(71) Applicant: Dialog Semiconductor Inc., Campbell, CA (US)

(72) Inventors: Athar Zaidi, San Jose, CA (US); Andrey B. Malinin, Fort Colins, CO (US)

(73) Assignee: Dialog Semiconductor, Inc., Campbell, CA (US)

( * ) Notice: Subject to any disclaimer, the term of this patent is extended or adjusted under 35 U.S.C. 154(b) by 100 days.

(21) Appl. No.: 14/701,432

(22) Filed: Apr. 30, 2015

(65) Prior Publication Data

US 2016/0322803 A1 Nov. 3, 2016

(51) Int. Cl.
*H02H 3/02* (2006.01)
*H02H 5/04* (2006.01)
*H01R 13/713* (2006.01)

(52) U.S. Cl.
CPC ............ *H02H 3/025* (2013.01); *H02H 5/043* (2013.01); *H01R 13/7137* (2013.01)

(58) Field of Classification Search
CPC .... B60L 11/1809; H02H 3/025; H02H 5/043; H01R 13/7137
See application file for complete search history.

(56) References Cited

U.S. PATENT DOCUMENTS

| | | | | | |
|---|---|---|---|---|---|
| 3,534,241 | A * | 10/1970 | Trenkler | ............... | H02J 7/0091 320/144 |
| 5,895,445 | A * | 4/1999 | Hong | ..................... | G08B 25/14 340/3.4 |
| 6,631,066 | B1 * | 10/2003 | Smith | ..................... | G05F 1/613 361/103 |
| 6,718,474 | B1 * | 4/2004 | Somers | ..................... | G06F 1/08 713/322 |
| 7,834,591 | B2 * | 11/2010 | Hussain | ................ | H01M 10/44 320/128 |
| 2011/0204849 | A1 * | 8/2011 | Mukai | ................... | B60L 3/0069 320/111 |

OTHER PUBLICATIONS

"Inside the Apple Lightning Cable," Chipworks, 2015, 3 pages, [Online] [Retrieved on Aug. 6, 2015] Retrieved from the Internet<URL: http://www.chipworks.com/en/technical-competitive-analysis/resources/blog/inside-the-apple-lightning-cable/>.

\* cited by examiner

*Primary Examiner* — Zeev V Kitov
(74) *Attorney, Agent, or Firm* — Fenwick & West LLP

(57) ABSTRACT

One embodiment of a disclosed cable protection device connected between the positive and negative wires of the cable that provides an efficient method of protection from overheating of the device due to changes in temperatures with minimal power dissipation. The cable protection device includes a temperature monitoring device that continuously senses the temperature of the cable and device to check for overheating. A controller connected to the temperature monitor sends out an alarm message and a control signal to either an actuator circuit or a crowbar function circuit. The actuator circuit can send out current pulses to the adapter indicating the adapter to lower its current limit, so that the device can still keep charging and is not over heated. The crowbar function circuit causes the adapter to turn off power to the cable in order to provide burning of the device or connector due to overheating.

11 Claims, 3 Drawing Sheets

CABLE PROTECTION DEVICE

BACKGROUND

1. Technical Field

The present disclosure relates to a power supply cable protection device for preventing a thermal runaway when connected to a portable device.

2. Description of the Related Art

Charging cables such as USB cables are widely used to connect AC adapter to a portable device for the purpose of charging the device battery. The current supplied to the charging cable is high and creates a risk of the cable and connector overheating and burning out. A protection device is embedded in the charging cable but the available protection devices shut off the power supply to the cable in case of a minor increase in the cable temperature. The protection devices are typically connected in series with the current path resulting in a high dissipation of power. Additionally the protection devices are large, expensive, and slow leading to an inefficient protection device.

SUMMARY

A cable protection device connected between the positive and negative wires of the cable provides an efficient method of protection from overheating of the device due to changes in temperatures with minimal power dissipation. The cable protection device includes a temperature monitoring device that continuously senses the temperature of the cable and device to check for overheating. A controller connected to the temperature monitor sends out an alarm message and a control signal to either an actuator circuit or a crowbar function circuit. The actuator circuit can send out current pulses to the adapter indicating the adapter to lower its current limit, so that the device can still keep charging and is not over heated. The crowbar function circuit causes the adapter to turn off power to the cable in order to prevent burning of the device or connector due to overheating.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

Figure 1:
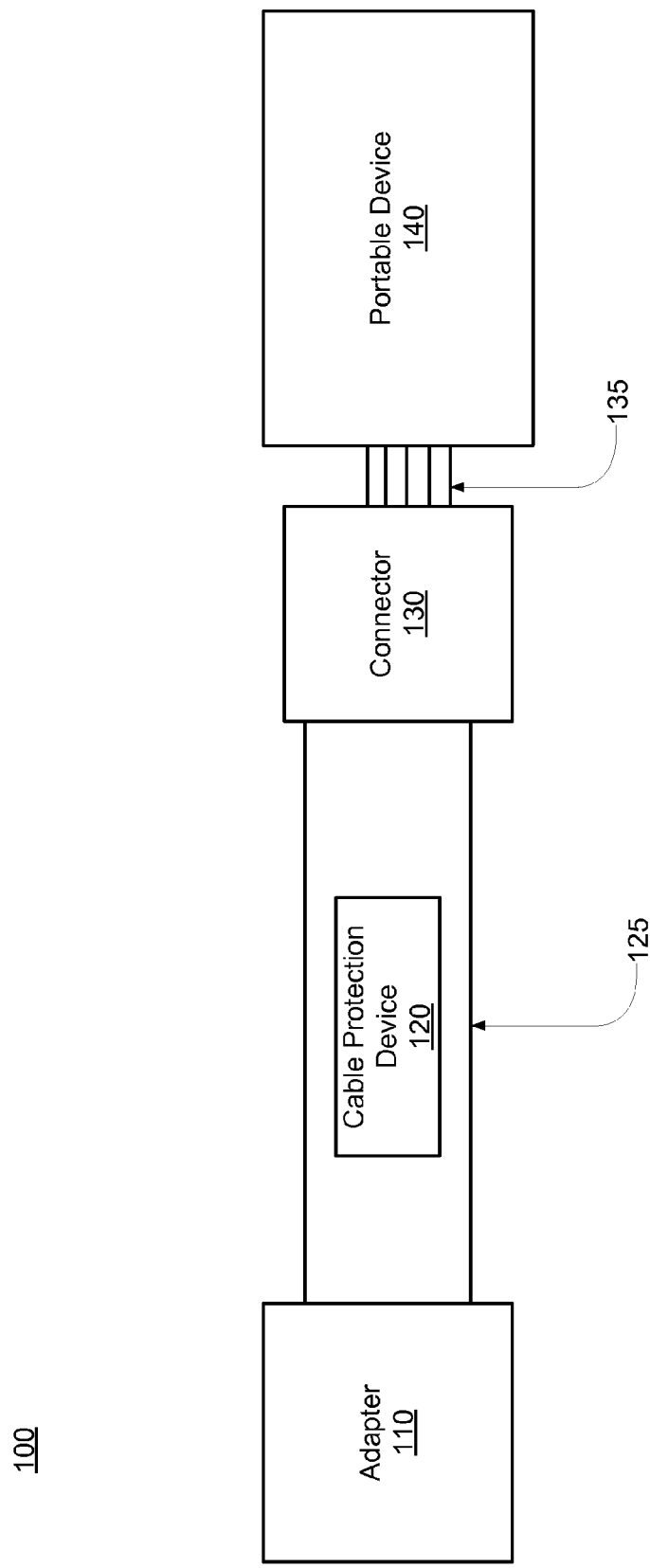
FIG. 1 is a block diagram illustrating a portable device charging environment including a cable protection device, according to one embodiment.

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the embodiments described herein.

Figure (FIG.) 1 is a block diagram illustrating a portable device charging environment including a cable protection device, according to one embodiment. The environment 100 includes an adapter 110, a charging cable 125, a cable protection device 120, a connector 130 and a portable device 140. The adapter plugs into the wall electrical socket, receives an AC power supply, converts it to a suitable DC voltage/current that the adapter may be rated for, and supplies the converted DC voltage to the charging cable 125. The cable protection device 120 is connected between the positive and negative wires of the charging cable 125. The cable protection device 120 is explained in detail below with reference to FIG. 2.

The charging cable 125 is connected to a portable device charging connector 130, for example, a USB connector, a mini-USB connector, USB type C connector or any other such connector. Each connector 130 has a set of electrical parameters including the maximum current rating that the connector 130 can handle. The connector 130 provides the required current for charging the portable device 140 via the connector pins 135. The connector pins 135 may include a supply voltage, data pins and a ground reference pin.

The portable device 140 includes one or more computing devices capable of receiving user input as well as transmitting and/or receiving data. In one embodiment, a portable device 140 is a smartphone, a tablet or a conventional computer system, such as a desktop or laptop computer. Alternatively, a portable device 140 may be a device having computer functionality that may access a set of mobile applications. The portable device 140 operates on a battery that is charged by the power supplied by the adapter 110 via the connector 130 connected by the charging cable 125.

Figure 2:
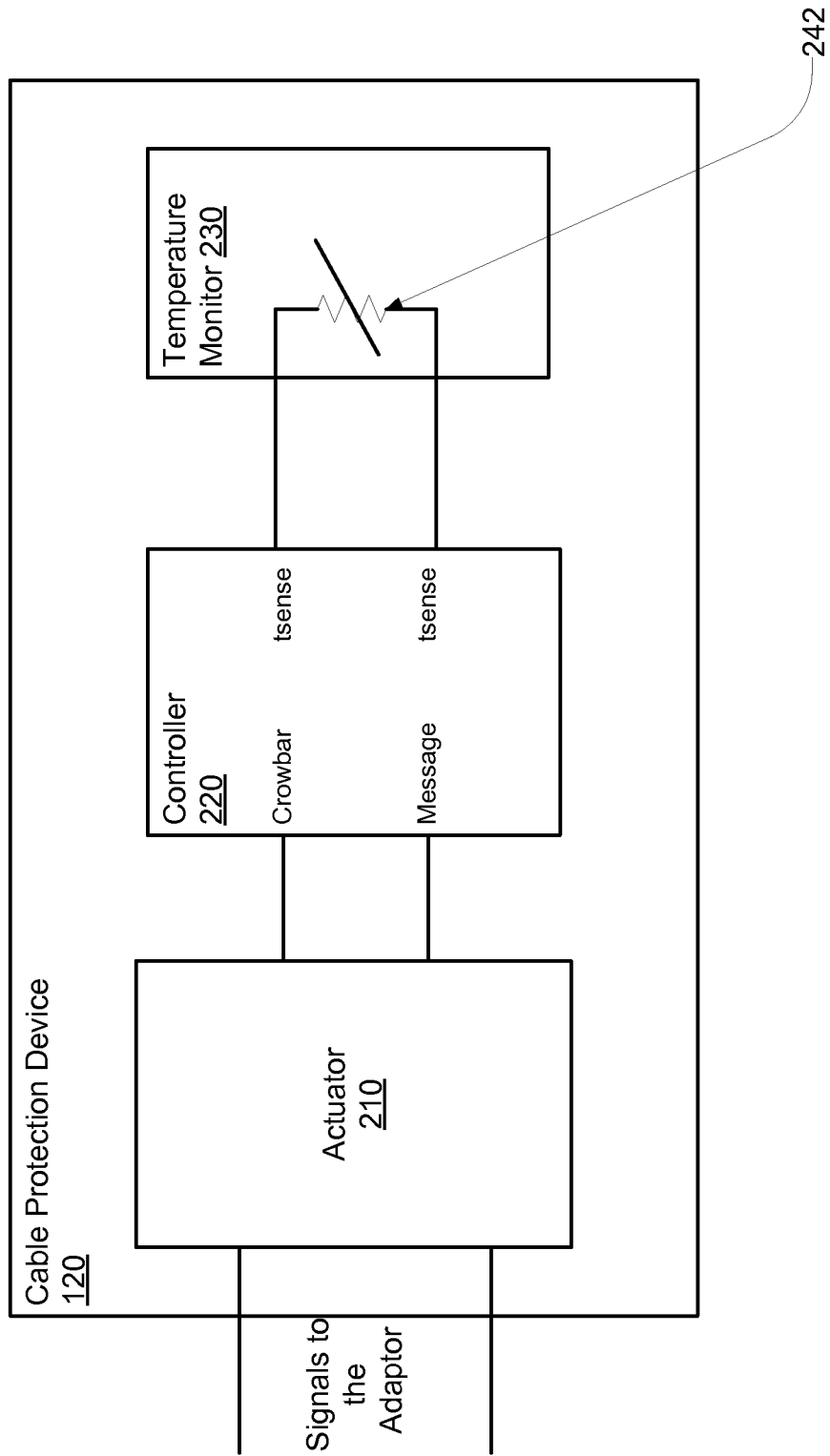
FIG. 2 is a block diagram illustrating the components of the cable protection device of FIG. 1, according to one embodiment.

FIG. 2 is a block diagram illustrating the components of the cable protection device of FIG. 1, according to one embodiment. The cable protection device 120 includes a temperature monitor 230, a controller 220 that includes a crowbar switch and an actuator circuit 210. The actuator is connected in parallel to the protection block of the adapter via control signals. The temperature monitor is connected to the connector attached to the charging cable that charges the portable device.

The temperature monitor 230 continuously monitors the temperature of either, the material or the air pocket of the connector 130 when the portable device is set up for charging. Examples of temperature monitor include temperature sensors 242 and temperature detecting circuits including resistors and transistors. The temperature monitors may operate based on detecting the current temperature, or some circuits may periodically detect a difference in temperatures from a reference temperature. The monitored temperature is fed to the controller 220.

The controller 220 adjusts the current supply to the connector 130 and the portable device 140 in case there is a minor increase in the temperature of the connector 130 and sends control signals to shut off the power supply in case of a thermal runaway. The controller 220 receives the monitored temperature and compares it to a programmable first threshold (e.g. 90° F.) that is stored in the memory of the controller 220 and compares the monitored temperature to the programmed first threshold.

If the monitored temperature is equal to or greater than the programmed first threshold, but less than a second threshold, the controller 220 sends a control signal to the actuator circuit 210 to send sink current pulses to the adapter 110. The sink current pulses are recognized by a controller in the adapter 110. The controller of the adapter 110 may reduce its current limit to a current level of the incoming sink current pulses. Additionally, the sink current pulses may be sent in an audible frequency range to produce an alarm message notifying a user of the portable device 140 of overheating of the cable connector. The control signal remains active till the temperature is reduced to an acceptable level (e.g. below the first threshold).

If the monitored temperature is equal to or greater than a programmed second threshold e.g. 110° F., although other thresholds may be used which can be based on a variety of factors such as the cable materials, the controller 220 sends a signal to the actuator circuit 210 to activate the crowbar circuit by driving a short circuit or a low impedance path across the output voltage, thus shutting the power supply to the connector 130 and the portable device 140. The control signal remains active till the temperature is reduced to an acceptable level (e.g. below the first threshold).

The actuator circuit 210 is connected in parallel to the controller 220 (the load) and to a protection block of the adapter 110 resulting in minimal power dissipation. The actuator circuit 210 generates sink current pulses or activates the crowbar circuit based on a control signal from the controller 220. The sink current pulses may be of audible frequency and generate noise/alarm message to notify a user of a portable device 140 of overheating of the charging cable 125. The activation of the crowbar circuit may cut off the power supply to the connector 130.

On receiving the sink current pulses, the controller at the adapter adjusts the current limit to the received current limit. Adjusting the current limit of the adapter will cause a reduction in the current supplied to the connector 130 via the charging cable 125. This allows the portable device 140 to continue to be charged and will prevent burning of the charging cable 125 and the connector 130 due to overheating.

On receiving the activation for the crowbar function, the adapter's over current protection circuit is triggered. The over protection circuit switches off the power supply to the charging cable 125 by enabling a short circuit or a low resistance path across the output voltage. This stops the further rise of temperature at the connector 130, thus preventing a thermal runaway and in effect, prevents damage to the charging cable 125, the connector 130 and the portable device 140. The crowbar function is active until it receives further control signals from the actuator circuit 210 of the cable protection device 120.

Figure 3:
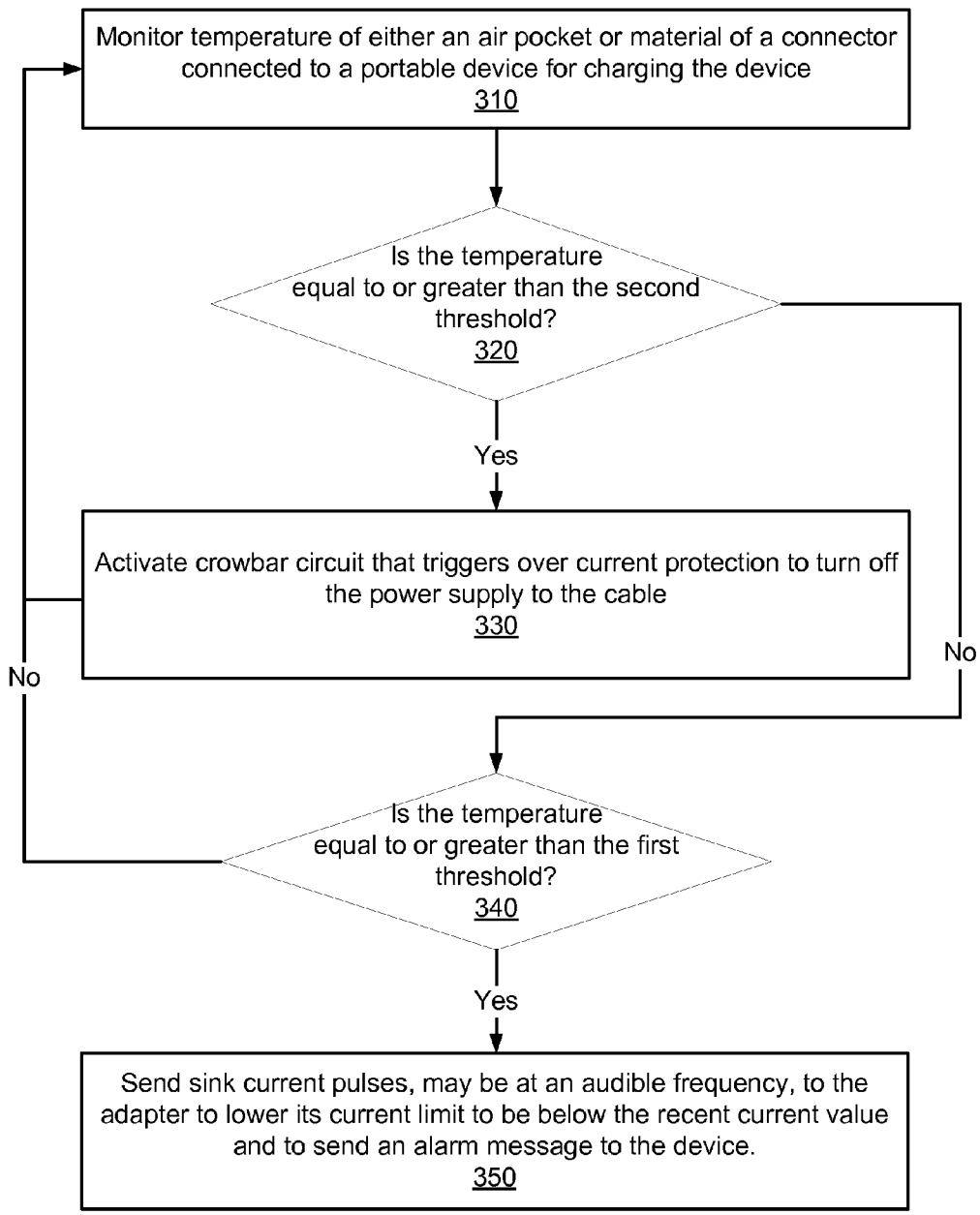
FIG. 3 is a flowchart illustrating the operation of a cable protection device of FIG. 1, according to one embodiment.

FIG. 3 is a flowchart illustrating the operation of a cable protection device of FIG. 1, according to one embodiment. The cable protection device 120 monitors 310 the temperature of either, the material or the air pocket of the connector when connected to a portable device for charging the device. The monitored temperature is compared 320 against a second threshold temperature that is programmable. If the monitored temperature is equal to or greater than the second threshold, the cable protection device 120 sends control signals to activate 330 the crowbar circuit of the adapter 110 to turn off the power supply to the charging cable 125 and the connector 130.

If the monitored temperature is not equal to or greater than the second threshold, the monitored temperature is compared 340 to a first threshold temperature. If the monitored temperature is equal to or greater than the first threshold temperature, the cable protection device 120 sends 350 sink current pulses that may be at an audible frequency to the adapter 110. The sink current pulses enable the adapter 110 to lower its current limit to the limit indicated by the sink current pulses, and the audible frequency may be used to notify the same to the user of the portable device 140 via an alarm message. If the monitored temperature is less than the first threshold temperature, the cable protection device 120 continues monitoring 310 and comparing 320 the connector temperature.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A method for protecting a charging cable, the method comprising:
    monitoring a temperature of a power supply cable;
    comparing the monitored temperature to a second threshold;
    activating a crowbar circuit when the monitored temperature exceeds the second threshold to turn off power supply to the charging cable;
    comparing the monitored temperature to a first threshold;
    generating a control signal based on the monitored temperature exceeding the first threshold;
    sending sink current pulses to an adapter of the charging cable in response to the generated control signal, when the monitored temperature exceeds the first threshold and the monitored temperature does not exceed the second threshold;
    recognizing, by a controller of the adapter, the sink current pulses; and
    reducing, by the controller of the adapter, a current of the adapter after the adapter receives the sink current pulses, when the monitored temperature exceeds the first threshold and the monitored temperature does not exceed the second threshold,
    wherein the control signal remains active until the monitored temperature is reduced below the first threshold.

2. The method of claim 1, further comprising sending the sink current pulses at an audible frequency.

3. The method of claim 2, further comprising notifying a user of an increase in the monitored temperature via an alarm message generated by the audible frequency.

4. The method of claim 1, wherein the first threshold temperature is programmable.

5. The method of claim 1, wherein the second threshold temperature is programmable.

6. A cable protection device, the device comprising of:
    an actuator circuit for controlling a flow of current of a charging cable;
    a controller circuit coupled in parallel to the actuator circuit, wherein the controller circuit sends signals to the actuator circuit to control the flow of current;
    a temperature monitor coupled to the controller circuit, wherein the temperature monitor monitors a temperature of the charging cable;
    an adapter connected in parallel to the actuator circuit; and
    a controller of the adapter, wherein
    the controller circuit sends a control signal to the actuator circuit to send sink current pulses to the adapter, when the monitored temperature exceeds a first threshold and the monitored temperature does not exceed a second threshold,
    the controller of the adapter recognizes the sink current pulses received from the actuator circuit,
    the controller of the adapter reduces a current of the adapter after the adapter receives the sink current pulses from the actuator circuit, when the monitored temperature exceeds the first threshold and the monitored temperature does not exceed the second threshold, and
    the control signal remains active until the monitored temperature is reduced below the first threshold.

7. The device of claim 6, wherein the controller circuit compares the monitored temperature to at least one of the first or the second threshold temperature included in the controller circuit.

8. The device of claim 6, wherein the actuator circuit instructs a crowbar circuit to shut off a power supply from the adapter.

9. The device of claim 6, wherein the controller circuit sends another control signal to the actuator circuit to activate a crowbar circuit to shut off a power supply from the adapter when the monitored temperature exceeds the second threshold.

10. The device of claim 6, wherein the sink current pulses are at the current level lower than a current limit of the adapter.

11. The device of claim 6, wherein the actuator circuit sends the sink current pulses to the adapter at an audible frequency to notify a user of an increase in the monitored temperature via an alarm message generated by the audible frequency.

* * * * *

UNITED STATES PATENT AND TRADEMARK OFFICE
CERTIFICATE OF CORRECTION

PATENT NO. : 9,912,142 B2  
APPLICATION NO. : 14/701432  
DATED : March 6, 2018  
INVENTOR(S) : Athar Zaidi and Andrey B. Malinin Page 1 of 1

It is certified that error appears in the above-identified patent and that said Letters Patent is hereby corrected as shown below:

In the Claims

Column no: 6, Line(s): 64, Claim 10: "at the current level" delete "the" and insert --a--

Signed and Sealed this
Second Day of October, 2018

Andrei Iancu
*Director of the United States Patent and Trademark Office*